US012561154B2

(12) United States Patent
Griffith et al.

(10) Patent No.: US 12,561,154 B2
(45) Date of Patent: Feb. 24, 2026

(54) LIVE UPDATING A VIRTUAL MACHINE VIRTUALIZING PHYSICAL RESOURCES

(71) Applicant: International Business Machines Corporation, Armonk, NY (US)

(72) Inventors: Douglas Griffith, Round Rock, TX (US); Anil Kalavakolanu, Austin, TX (US); Peter J. Heyrman, Rochester, MN (US); James A. Pafumi, Leander, TX (US); Vani D. Ramagiri, Austin, TX (US); Alexandre Blancke, Carpentras (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1203 days.

(21) Appl. No.: 17/375,948

(22) Filed: Jul. 14, 2021

(65) Prior Publication Data

US 2023/0015103 A1     Jan. 19, 2023

(51) Int. Cl.
*G06F 9/455* (2018.01)
*G06F 8/65* (2018.01)
*G06F 9/50* (2006.01)

(52) U.S. Cl.
CPC ............ *G06F 9/45558* (2013.01); *G06F 8/65* (2013.01); *G06F 9/5016* (2013.01); *G06F 9/5077* (2013.01); *G06F 2009/45583* (2013.01); *G06F 2009/45595* (2013.01)

(58) Field of Classification Search
CPC .............. G06F 9/45558; G06F 9/5016; G06F 9/5077; G06F 2009/45583; G06F 9/4868; G06F 2009/45579; G06F 2009/45575; G06F 8/65
See application file for complete search history.

(56) References Cited

U.S. PATENT DOCUMENTS

| | | | |
|---|---|---|---|
| 7,000,229 | B2 | 2/2006 | Gere |
| 9,569,200 | B2 | 2/2017 | Filali-Adib et al. |
| 9,582,510 | B2 | 2/2017 | Tabenkin et al. |
| 10,423,572 | B2 | 9/2019 | Tamura et al. |

(Continued)

OTHER PUBLICATIONS

Dhaliwal et al. ("IBM AIX Enhancements and Modernization" Redbook, Jan. 2020) (Year: 2020).*
Dhaliwal et al., IBM AIX Enhancements and Modernization, Jan. 2020, figures 1-1; section 1.1; 1.5.3.

(Continued)

*Primary Examiner* — Lewis A Bullock, Jr.
*Assistant Examiner* — Kevin X Lu
(74) *Attorney, Agent, or Firm* — Garg Law Firm, PLLC; Rakesh Garg; Teddi Maranzano

(57)     ABSTRACT

For a first virtual machine (VM) executing in a physical machine, a second VM is instantiated in the physical machine, the first VM using a physical adapter installed in the physical machine, the first VM virtualizing a portion of physical memory of the physical machine, the second VM virtualizing the physical adapter. The second VM is deployed using a memory mapping virtualizing the portion of physical memory. Checkpointing of an application executing in the first VM is caused, generating application state data of the application. The application is caused to execute in the second VM using the application state data. Process data of the application is caused to be updated in the second VM, the updating instructing the application to use the memory mapping.

20 Claims, 8 Drawing Sheets

(56) References Cited

U.S. PATENT DOCUMENTS

| | | | | |
|---|---|---|---|---|
| 10,871,960 | B2 | 12/2020 | Bashi et al. | |
| 2009/0172301 | A1* | 7/2009 | Ebersole | G06F 15/16 |
| | | | | 711/E12.001 |
| 2015/0324217 | A1* | 11/2015 | Shilmover | G06F 9/45558 |
| | | | | 718/1 |
| 2016/0378525 | A1* | 12/2016 | Bjorkengren | G06F 9/45558 |
| | | | | 718/1 |
| 2018/0146020 | A1* | 5/2018 | McClure | H04L 65/762 |
| 2018/0314541 | A1* | 11/2018 | Khan | G06F 9/45558 |
| 2018/0373557 | A1* | 12/2018 | Dong | G06F 13/4022 |
| 2019/0163521 | A1* | 5/2019 | Lee | G06F 9/4856 |
| 2021/0342232 | A1* | 11/2021 | Gopalan | G06F 11/1451 |
| 2023/0009596 | A1* | 1/2023 | Zhang | G06F 9/45558 |

OTHER PUBLICATIONS

Makris et al., Dynamic and Adaptive Updates of Non-Quiescent Subsystems in Commodity Operating System Kernels, Mar. 21-23, 2007, Proceedings of the 2nd ACM SIGOPS/EuroSys European Conference on Computer Systems 2007.

Armstrong et al., "IBM POWER6 partition mobility: Moving virtual servers seamlessly between physical systems", Published in IBM Journal of Research and Development, vol. 51, Issue 6, Nov. 2007, pp. 757-762, https://ieeexplore.ieee.org/document/5388623.

* cited by examiner

LIVE UPDATING A VIRTUAL MACHINE VIRTUALIZING PHYSICAL RESOURCES

BACKGROUND

The present invention relates generally to a method, system, and computer program product for live updating a virtual machine. More particularly, the present invention relates to a method, system, and computer program product for live updating a virtual machine virtualizing physical resources.

A virtual machine (VM) is computer software that emulates the physical components of a computer system. A hypervisor is software that manages one or more virtual machines executing in one physical computer system or host. A VM emulates, or virtualizes, physical components of the host, such as processors, memory, and input/output resources for storage, network, and other peripherals, so that to an operating system executing in the VM a virtual component behaves the same as the corresponding physical component.

Live updating refers to updating an operating system, or portion of the operating system, without restarting the operating system. Because the operating system does not need to be restarted, it remains live, able to provide services to applications executing in the operating system. Updating an operating system implements bug fixes and additional functionality.

SUMMARY

The illustrative embodiments provide a method, system, and computer program product. An embodiment includes a method that instantiates, for a first virtual machine (VM) executing in a physical machine, a second VM in the physical machine, the first VM using a physical adapter installed in the physical machine, the first VM virtualizing a portion of physical memory of the physical machine, the second VM virtualizing the physical adapter. An embodiment deploys, using a memory mapping virtualizing the portion of physical memory, the second VM. An embodiment causes checkpointing of an application executing in the first VM, the checkpointing generating application state data of the application. An embodiment causes executing of, in the second VM using the application state data, the application. An embodiment causes updating, in the second VM, process data of the application, the updating instructing the application to use the memory mapping.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
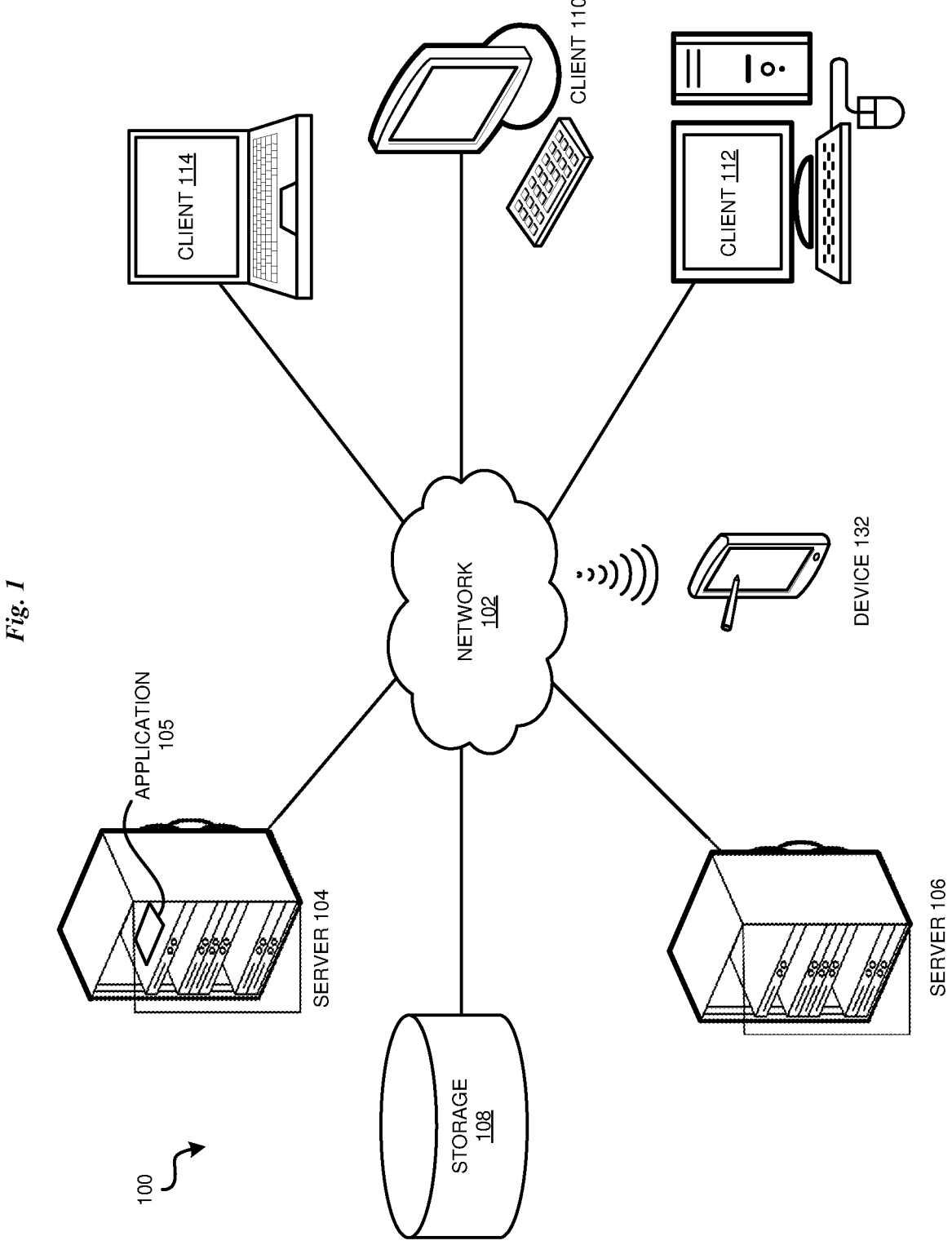
FIG. 1 depicts a block diagram of a network of data processing systems in which illustrative embodiments may be implemented.

The illustrative embodiments recognize that updating an operating system can be performed by stopping applications currently executing in the operating system, applying the updates, and restarting the operating system and applications. However, the updating process can be time consuming. In addition, because the operating system is unavailable for normal use during the updating process, applications executing in the operating system are also unavailable for use during updating. As a result, a live update capability, without the necessity for rebooting the operating system, is preferred.

The illustrative embodiments also recognize that live updating a VM can be implemented by instantiating a new VM, applying the updates to the new VM, duplicating virtual resources of the old VM on the new VM, then moving executing processes from the old VM to the new VM. Once the processes are executing in the new VM, the old VM can be removed. Duplicating virtual adapters simply requires duplicating a mapping between a virtual adapter and a corresponding physical adapter. However, moving executing processes requires copying portions of memory used by the executing processes from the old VM to the new VM. However, copying the terabytes of data required by current systems is both time consuming and degrades system performance. In addition, such large portions of memory might not be available on a standalone system, without access to networked storage on another device. As a result, the illustrative embodiments that there is an unmet need for a method of live updating a VM without copying such large portions of memory between VMs, that is usable on a standalone system.

The illustrative embodiments recognize that the presently available tools or solutions do not address these needs or provide adequate solutions for these needs. The illustrative embodiments used to describe the invention generally address and solve the above-described problems and other problems related to live updating a virtual machine virtualizing physical resources.

An embodiment can be implemented as a software application. The application implementing an embodiment can be configured as a modification of an existing VM management system such as a hypervisor or Hardware Management Console (HMC) implementation, as a separate application that operates in conjunction with an existing VM management system, a standalone application, or some combination thereof.

Particularly, some illustrative embodiments provide a method that live updates a first VM executing in a physical machine by instantiating a second VM virtualizing a physical adapter on the physical machine, deploying the second VM, checkpointing an application executing in the first VM, stopping execution of the application on the first VM and executing the application on the second VM, and updating process data of the application to use a memory mapping of a portion of physical memory the first VM had been virtualizing.

An embodiment starts with a source VM to be live updated. The source VM is executing in a physical machine and using a memory mapping to virtualize a portion of the physical machine's physical memory. The physical machine includes one or more physical input/output resources, or adapters, capable of presenting a virtual version of the physical hardware. One non-limiting examples of a physical adapter is a network interface adapter. For example, NPIV (N_Port ID Virtualization) is a presently known software technique that allows sharing of a single physical Fibre Channel adapter, by presenting multiple virtual versions of the single physical adapter. (Fibre Channel is a registered trademark of the Fibre Channel Industry Association in the United States and other countries.) A Fibre Channel adapter is typically used to access networked storage located elsewhere than the physical machine on which the source VM is executing. As another example, Single Root I/O Virtualization (SR-IOV) is a presently known software technique that allows sharing of a single physical Ethernet adapter, by presenting multiple virtual versions of the single physical adapter. (Ethernet is a registered trademark of Xerox Corporation in the United States and other countries.) An Ethernet adapter is typically used to communicate over a network with other physical machines. A VM virtualizes a physical adapter by configuring, or mapping, a virtual network adapter interface within the VM to communicate directly with a virtual version of a physical adapter.

To begin the live update process, an embodiment instantiates a second, surrogate VM on the same physical machine as the source VM. The surrogate VM is configured to virtualize one or more physical adapters of the physical machine needed during the live update process, by configuring, or mapping, a virtual network adapter interface within the VM to communicate directly with a virtual version of a physical adapter. In one embodiment, the surrogate VM virtualizes one physical Ethernet adapter and one physical Fibre Channel adapter. In other embodiments, the surrogate VM virtualizes more, fewer, or different physical adapters. In instantiating the surrogate VM, an embodiment includes an update to software of the surrogate VM, so that the surrogate VM is an updated version of the source VM.

An embodiment deploys the instantiated surrogate VM. Upon completion of the deployment, the instantiated surrogate VM is ready to execute one or more applications. As part of the deployment, an embodiment configures a memory mapping of the surrogate VM to be the same as the memory mapping the source VM is using to virtualize physical memory. Thus, both the source and surrogate VMs are virtualizing the same portion of physical memory. Techniques for monitoring which portions of memory are referenced and modified, and configuring two VMs to reference the same portion of physical memory, are presently known.

An embodiment migrates one or more applications executing in the source VM to the deployed surrogate VM. In particular, an embodiment checkpoints an application executing in the source VM, or causes the source VM to checkpoint an application. Checkpointing is a presently known technique that generates state data of the application and stores the state data outside the application. The state data includes data necessary to restart the application from the point at which the application was checkpointed, thus avoiding starting the application from its initial configuration. An embodiment stops the checkpointed application from executing in the source VM, or causes the source VM to stop the checkpointed application. An embodiment copies the checkpointed application and application state data to the surrogate VM, and starts, or causes the surrogate VM to start, the application from the checkpointed state, using state data, on the surrogate VM.

An embodiment also migrates any virtualized adapters of the source VM that were not virtualized during surrogate VM instantiation, by causing the surrogate VM to virtualize any adapters the source VM is virtualizing.

While a migrated application is executing in the surrogate VM, an embodiment causes a background process of the second VM to update the moved application's process data to use the surrogate VM's memory mapping. If the moved application accesses memory using the source VM's memory mapping (i.e., before the background process has performed its update), a page fault handler of the surrogate VM intercepts the outdated mapping, and accesses the referenced memory using the surrogate VM's memory mapping instead.

Once one or more applications executing in the source VM have been checkpointed, the applications can be suspended from execution in the source VM. As well, once any migrated applications are executing in the surrogate VM, the source VM can be removed from executing on the physical machine.

The manner of live updating a virtual machine virtualizing physical resources described herein is unavailable in the presently available methods in the technological field of endeavor pertaining to VM management. A method of an embodiment described herein, when implemented to execute on a device or data processing system, comprises substantial advancement of the functionality of that device or data processing system in live updating a first VM executing in a physical machine by instantiating a second VM virtualizing a physical adapter on the physical machine, deploying the second VM, checkpointing an application executing in the first VM, stopping execution of the application on the first VM and executing the application on the second VM, and updating process data of the application to use a memory mapping of a portion of physical memory the first VM had been virtualizing. As a result, instead of copying entire portions of memory used by executing processes from one VM to another, only application state data and mappings need be copied.

The illustrative embodiments are described with respect to certain types of physical adapters, virtual adapters, physical memory, virtual memory, VMs, hypervisors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
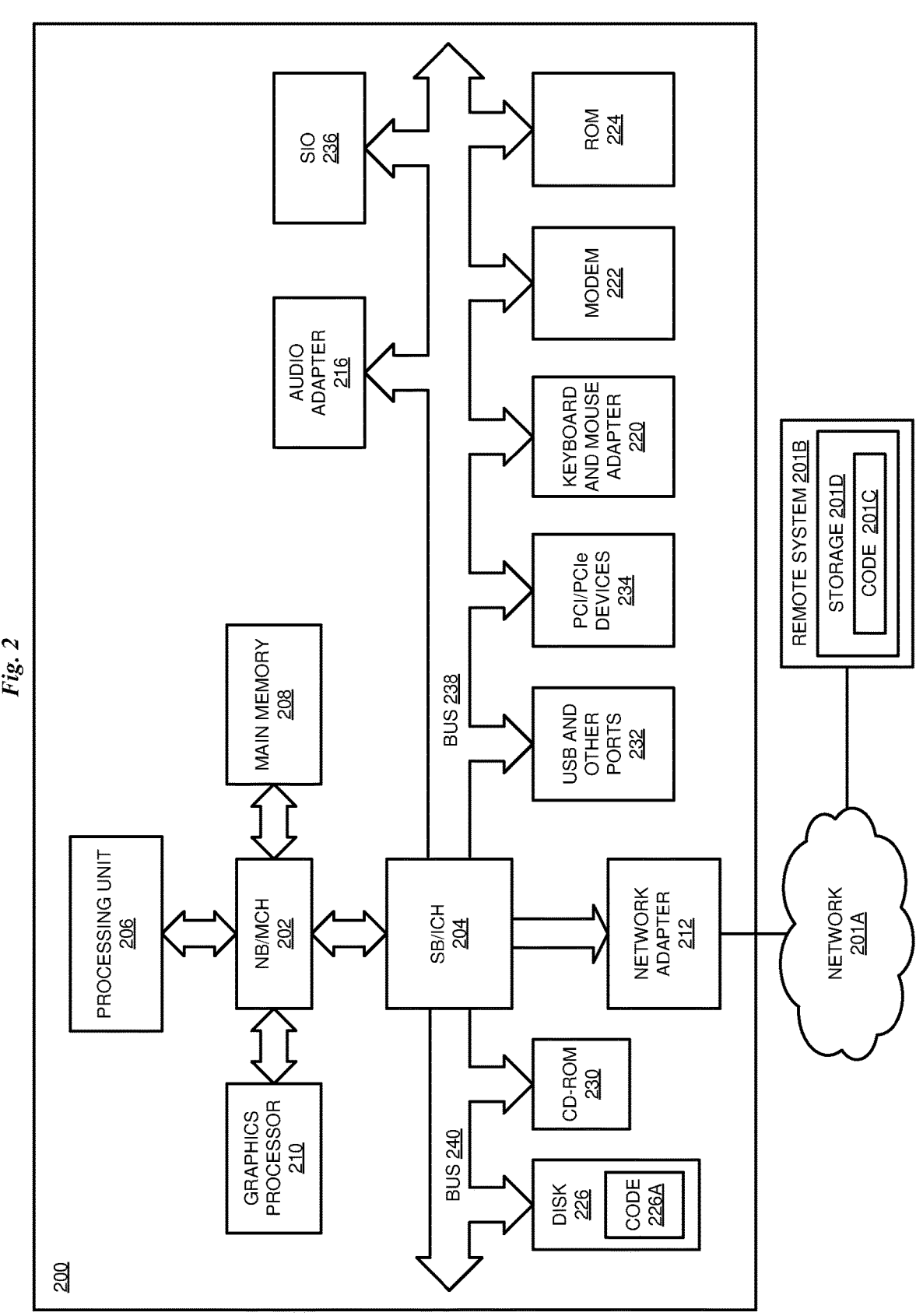
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing in data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
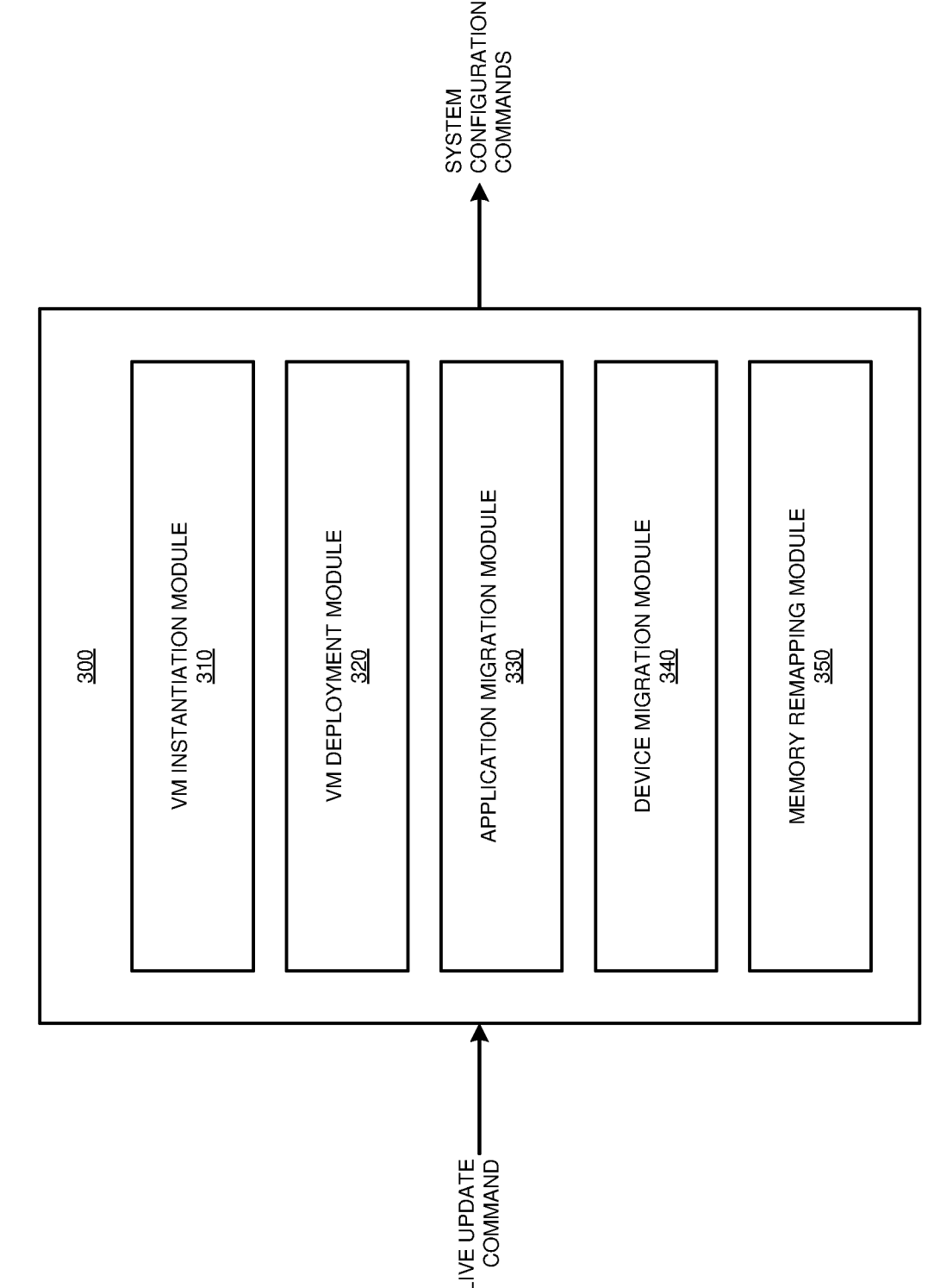
FIG. 3 depicts a block diagram of an example configuration for live updating a virtual machine virtualizing physical resources in accordance with an illustrative embodiment.

With reference to FIG. 3, this figure depicts a block diagram of an example configuration for live updating a virtual machine virtualizing physical resources in accordance with an illustrative embodiment. Application 300 is an example of application 105 in FIG. 1 and executes in any of servers 104 and 106, clients 110, 112, and 114, and device 132 in FIG. 1.

Application 300 receives a command to perform a live update on a source VM. The source VM is executing in a physical machine and using a memory mapping to virtualize a portion of the physical machine's physical memory. The physical machine includes one or more physical input/output resources, or adapters, capable of presenting a virtual version of the physical hardware.

To begin the live update process, VM instantiation module 310 instantiates a second, surrogate VM on the same physical machine as the source VM. The surrogate VM is configured to virtualize one or more physical adapters of the physical machine needed during the live update process, by configuring, or mapping, a virtual network adapter interface within the VM to communicate directly with a virtual version of a physical adapter. In one implementation of module 310, the surrogate VM virtualizes one physical Ethernet adapter and one physical Fibre Channel adapter. In other implementations, the surrogate VM virtualizes more, fewer, or different physical adapters. In instantiating the surrogate VM, module 310 includes an update to software of the surrogate VM, so that the surrogate VM is an updated version of the source VM.

VM deployment module 320 deploys the instantiated surrogate VM. Upon completion of the deployment, the instantiated surrogate VM is ready to execute one or more applications. As part of the deployment, module 320 configures a memory mapping of the surrogate VM to be the same as the memory mapping the source VM is using to virtualize physical memory. Thus, both the source and surrogate VMs are virtualizing the same portion of physical memory.

Application migration module 330 migrates one or more applications executing in the source VM to the deployed surrogate VM. In particular, module 330 checkpoints an application executing in the source VM, or causes the source VM to checkpoint an application. Module 330 stops the checkpointed application from executing in the source VM, or causes the source VM to stop the checkpointed application. Module 330 copies the checkpointed application and application state data to the surrogate VM, and starts, or causes the surrogate VM to start, the application from the checkpointed state, using the state data, on the surrogate VM.

Device migration module 340 migrates any virtualized adapters of the source VM that were not virtualized during surrogate VM instantiation, by causing the surrogate VM to virtualize any adapters the source VM is virtualizing.

While a migrated application is executing in the surrogate VM, memory remapping module 350 causes a background process of the second VM to update the moved application's process data to use the surrogate VM's memory mapping. If the moved application accesses memory using the source VM's memory mapping (i.e., before the background process has performed its update), a page fault handler of the surrogate VM intercepts the outdated mapping, and accesses the referenced memory using the surrogate VM's memory mapping instead.

Figure 4:
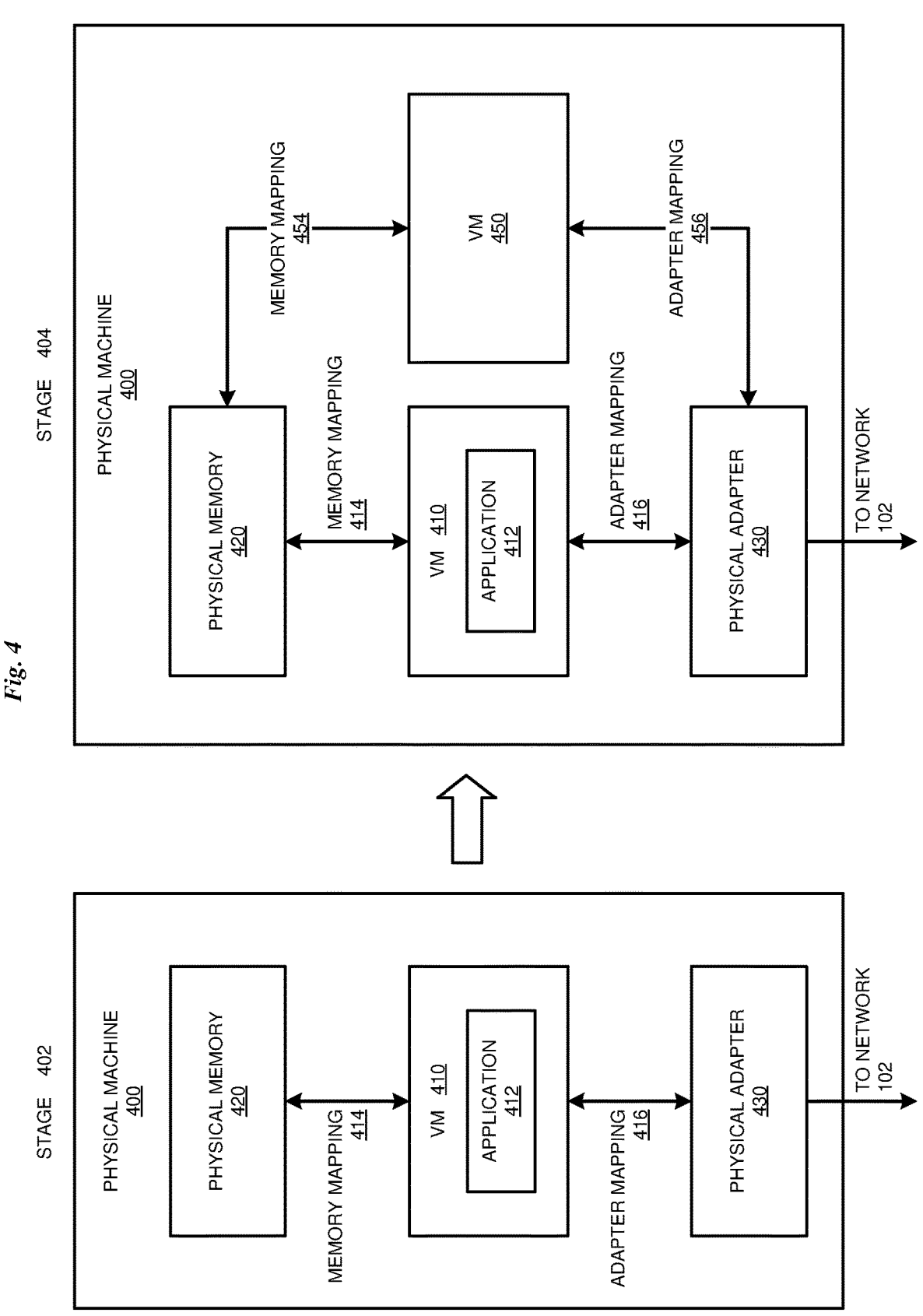
FIG. 4 depicts an example of live updating a virtual machine virtualizing physical resources in accordance with an illustrative embodiment.

With reference to FIG. 4, this figure depicts an example of live updating a virtual machine virtualizing physical resources in accordance with an illustrative embodiment. The example can be executed using application 300 in FIG. 3. Network 102 is the same as network 102 in FIG. 1.

Stage 402 depicts VM 410 executing in physical machine 400. Application 412 is executing in VM 410. VM 410 interfaces to physical adapter 430, a network interface adapter, via adapter mapping 416. VM 410 interfaces to physical memory 420 via memory mapping 414. VM 410 is a source VM to be live updated.

At stage 404, VM 450, the surrogate VM, has been instantiated on physical machine 400. VM 450 interfaces to physical adapter 430 via adapter mapping 456. VM 450 has also been deployed, establishing memory mapping 454 to physical memory 420. Application 412 is still executing in VM 410.

Figure 5:
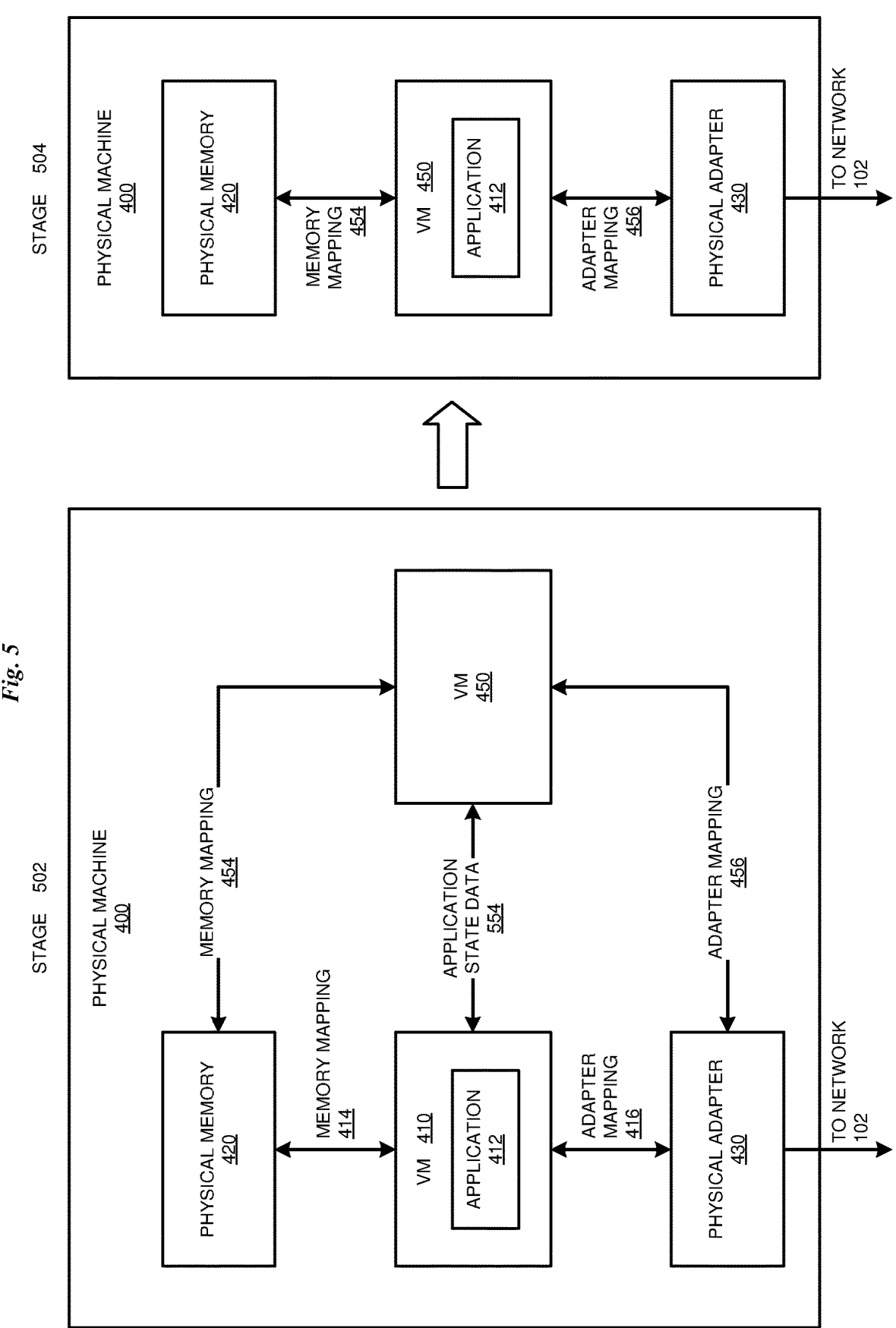
FIG. 5 depicts a continued example of live updating a virtual machine virtualizing physical resources in accordance with an illustrative embodiment.

With reference to FIG. 5, this figure depicts a continued example of live updating a virtual machine virtualizing physical resources in accordance with an illustrative embodiment. Network 102 is the same as network 102 in FIG. 1. Physical machine 400, VM 410, application 412, memory mapping 414, adapter mapping 416, physical memory 420, physical adapter 430, VM 450, memory mapping 454, and adapter mapping 456 are the same as physical machine 400, VM 410, application 412, memory mapping

414, adapter mapping 416, physical memory 420, physical adapter 430, VM 450, memory mapping 454, and adapter mapping 456 in FIG. 4.

At stage 502, VM 450 is ready to execute applications. Thus, application 412 has been checkpointed and the resulting data, application state data 554, is being copied to VM 450.

At stage 504, application 412 has been restarted from application state data 554 and is now executing in VM 450. Process data of application 412 has been updated to use memory mapping 454. In addition, application 412 has been suspended from execution and VM 410 removed from executing on physical machine 400.

Figure 6:
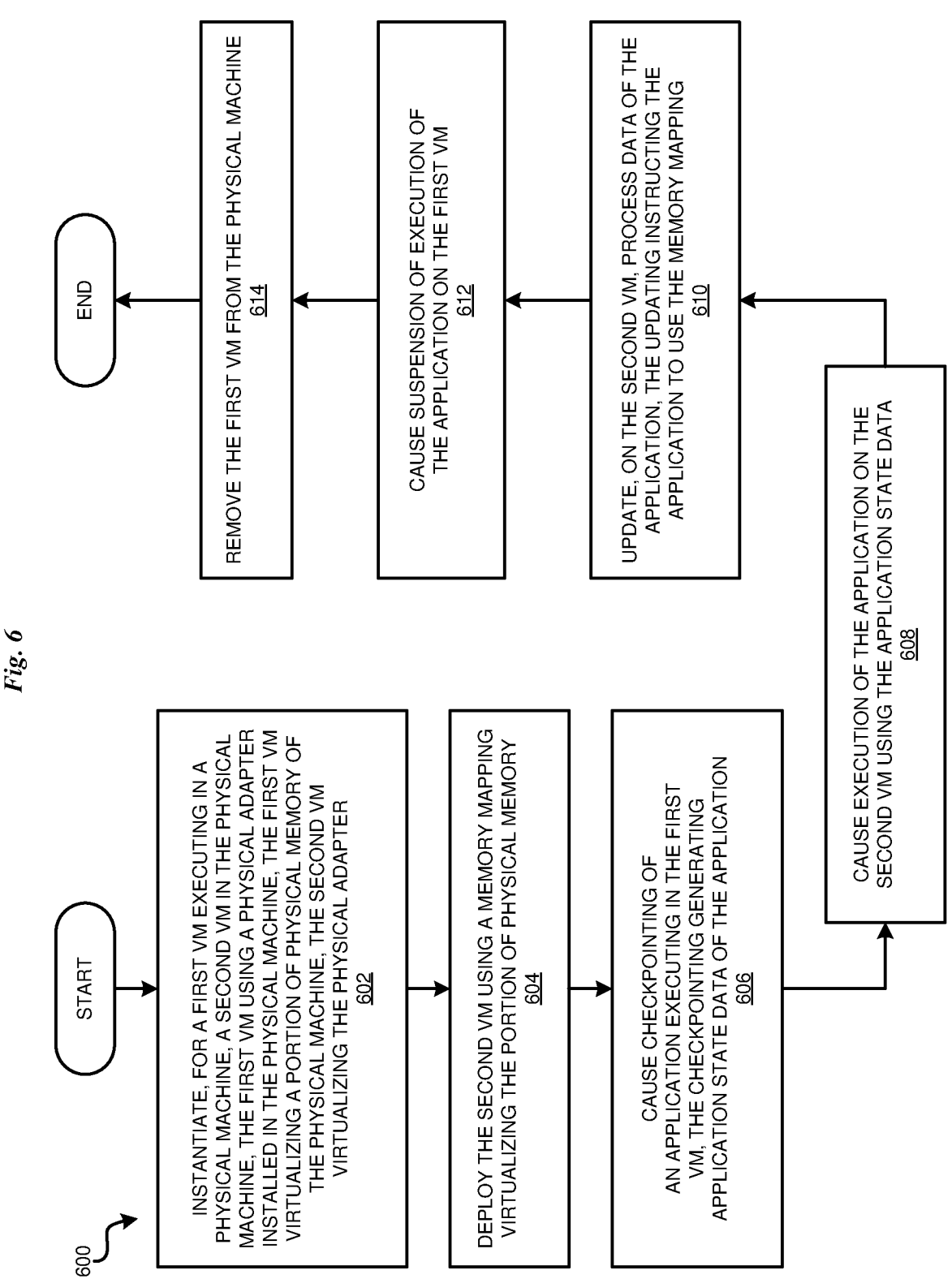
FIG. 6 depicts a flowchart of an example process for live updating a virtual machine virtualizing physical resources in accordance with an illustrative embodiment.

With reference to FIG. 6, this figure depicts a flowchart of an example process for live updating a virtual machine virtualizing physical resources in accordance with an illustrative embodiment. Process 600 can be implemented in application 300 in FIG. 3.

In block 602, the application instantiates, for a first VM executing in a physical machine, a second VM in the physical machine, the first VM using a physical adapter installed in the physical machine, the first VM virtualizing a portion of physical memory of the physical machine, the second VM virtualizing the physical adapter. In block 604, the application deploys the second VM using a memory mapping virtualizing the portion of physical memory. In block 606, the application causes checkpointing of an application executing in the first VM, the checkpointing generating application state data of the application. In block 608, the application causes execution of the application on the second VM using the application state data. In block 610, the application updates, on the second VM, process data of the application, the updating instructing the application to use the memory mapping. In block 612, the application causes suspension of execution of the application on the first VM. In block 614, the application removes the first VM from the physical machine. Then the application ends.

Figure 7:
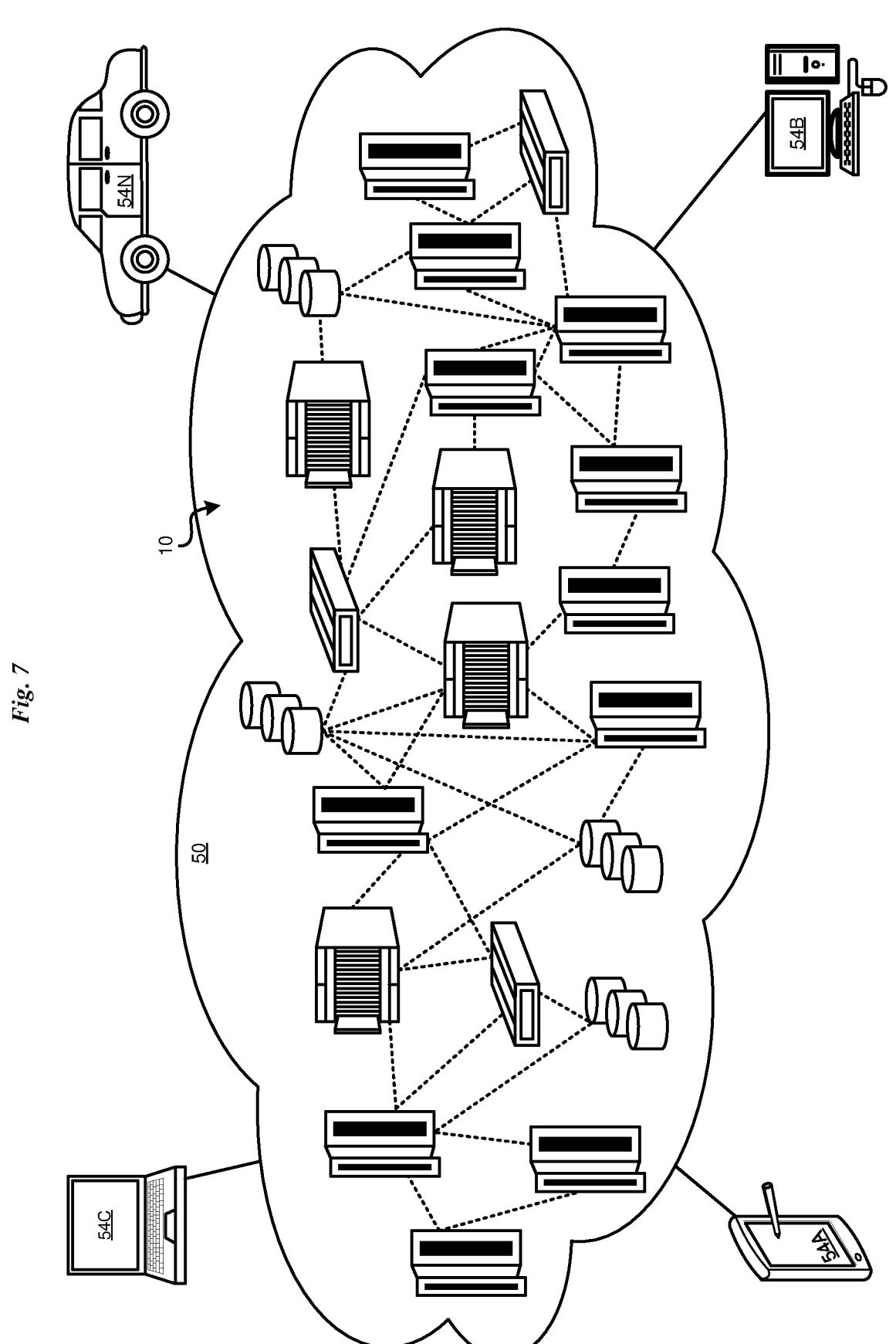
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
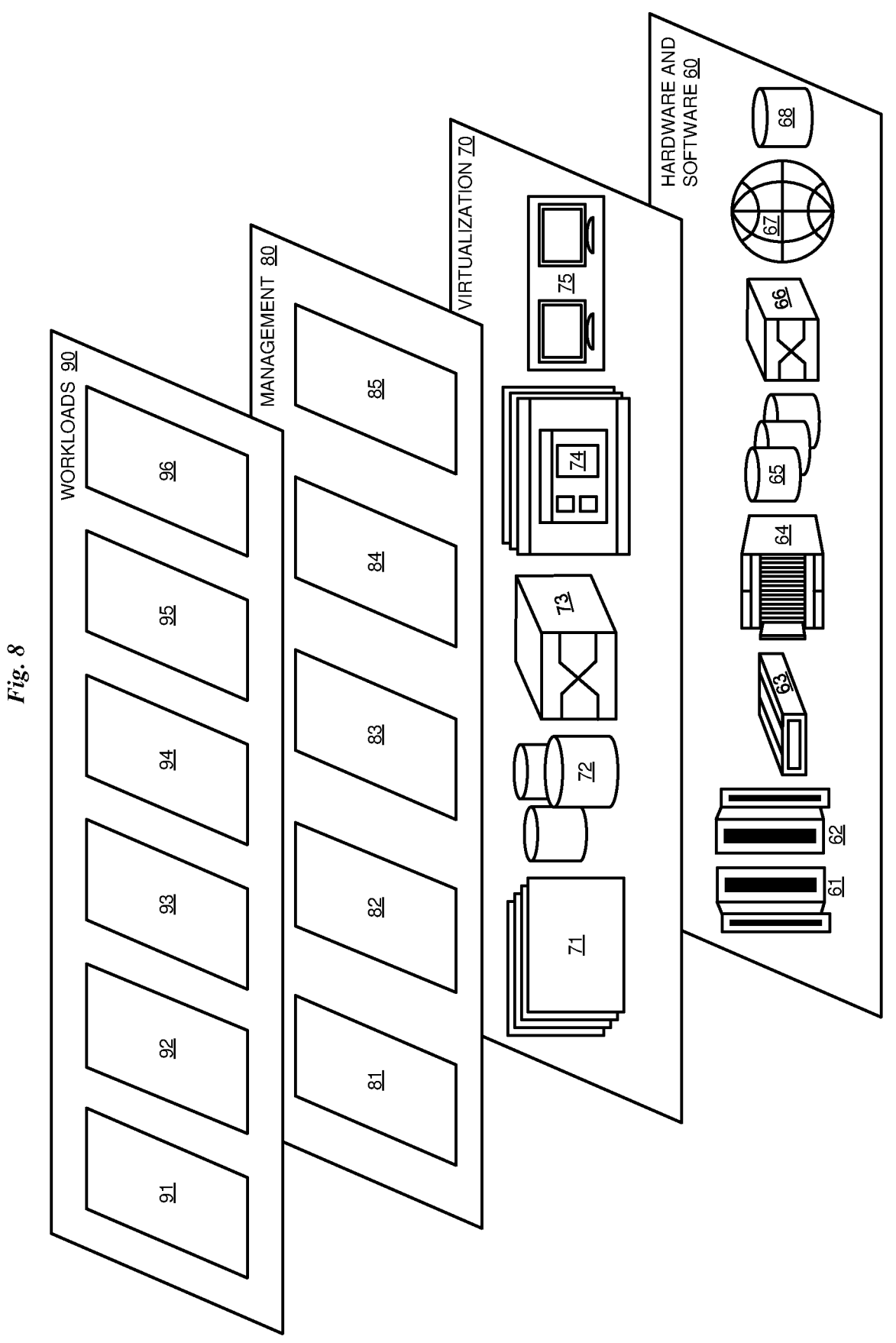
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for live updating a virtual machine virtualizing physical resources and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   instantiating, for a first virtual machine (VM) executing in a physical machine, a second VM in the physical machine, the first VM using a physical adapter installed in the physical machine, the first VM virtualizing a portion of physical memory of the physical machine, the second VM virtualizing the physical adapter;
   deploying, using a memory mapping virtualizing the portion of physical memory, the second VM;
   checkpointing an application executing in the first VM, the checkpointing generating application state data of the application, the application state data including data necessary to restart the application from a point at which the application was checkpointed;
   executing the application in the second VM using the application state data, wherein using the application state data avoids starting the application from an initial configuration state in the second VM;
   updating, in the second VM, the applications process data reference associated with the memory mapping, wherein the application process data references data stored in the portion of physical memory and the updating instructing the application to use the memory mapping;
   intercepting, by a page fault handler in the second VM, and responsive to the application in the second VM making an outdated reference to the first VM's virtualization of the portion of the physical memory prior to a completion of the updating, the applications process data reference to the memory mapping; and
   accessing, by the page fault handler, the portion of the physical memory using a corresponding reference from the second VM's memory mapping without moving data from the portion of the physical memory.

2. The computer-implemented method of claim 1, wherein the physical adapter comprises a network interface adapter.

3. The computer-implemented method of claim 1, wherein instantiating the second VM comprises updating software of the second VM relative to software of the first VM.

4. The computer-implemented method of claim 1, further comprising:
   causing virtualizing, in the second VM, a second physical adapter virtualized by the first VM.

5. The computer-implemented method of claim 1, further comprising:
   causing, subsequent to the checkpointing, suspending execution of the application on the first VM.

6. The computer-implemented method of claim 1, further comprising:
   removing, from execution on the physical machine subsequent to the checkpointing, the first VM.

7. A computer program product for live updating a virtual machine, the computer program product comprising:
   one or more computer readable storage media, and program instructions collectively stored on the one or more computer readable storage media, the stored program instructions comprising:
   program instructions to instantiate, for a first virtual machine (VM) executing in a physical machine, a second VM in the physical machine, the first VM using a physical adapter installed in the physical machine, the first VM virtualizing a portion of physical memory of the physical machine, the second VM virtualizing the physical adapter;
   program instructions to deploy, using a memory mapping virtualizing the portion of physical memory, the second VM;
   program instructions to checkpoint an application executing in the first VM, the checkpointing generating application state data of the application, the application state data including data necessary to restart the application from a point at which the application was check-pointed;

program instructions to execute the application in the second VM using the application state data, wherein using the application state data avoids starting the application from an initial configuration state in the second VM;

program instructions to update, in the second VM, the applications process data reference associated with the memory mapping, wherein the application process data references data stored in the portion of physical memory and the updating instructing the application to use the memory mapping;

program instructions to intercept, by a page fault handler in the second VM, and responsive to the application in the second VM making an outdated reference to the first VM's virtualization of the portion of the physical memory prior to a completion of the updating the applications process data reference to the memory mapping; and program instructions to access, by the page fault handler, the portion of the physical memory using a corresponding reference from the second VM's memory mapping without moving data from the portion of the physical memory.

8. The computer program product of claim 7, wherein the physical adapter comprises a network interface adapter.

9. The computer program product of claim 7, wherein instantiating the second VM comprises updating software of the second VM relative to software of the first VM.

10. The computer program product of claim 7, the stored program instructions further comprising:

program instructions to cause virtualizing, in the second VM, a second physical adapter virtualized by the first VM.

11. The computer program product of claim 7, the stored program instructions further comprising:

program instructions to cause, subsequent to the check-pointing, suspending execution of the application on the first VM.

12. The computer program product of claim 7, the stored program instructions further comprising:

program instructions to remove, from execution on the physical machine subsequent to the checkpointing, the first VM.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to instantiate, for a first virtual machine (VM) executing in a physical machine, a second VM in the physical machine, the first VM using a physical adapter installed in the physical machine, the first VM virtualizing a portion of physical memory of the physical machine, the second VM virtualizing the physical adapter;

program instructions to deploy, using a memory mapping virtualizing the portion of physical memory, the second VM;

program instructions to checkpoint an application executing in the first VM, the checkpointing generating application state data of the application, the application state data including data necessary to restart the application from a point at which the application was check-pointed;

program instructions to execute the application in the second VM using the application state data, wherein using the application state data avoids starting the application from an initial configuration state in the second VM;

program instructions to update, in the second VM, the applications process data reference associated with the memory mapping, wherein the application process data references data stored in the portion of physical memory and the updating instructing the application to use the memory mapping;

program instructions to intercept, by a page fault handler in the second VM, and responsive to the application in the second VM making an outdated reference to the first VM's virtualization of the portion of the physical memory prior to a completion of the updating, the applications process data reference to the memory mapping; and program instructions to access, by the page fault handler, the portion of the physical memory using a corresponding reference from the second VM's memory mapping without moving data from the portion of the physical memory.

17. The computer system of claim 16, wherein the physical adapter comprises a network interface adapter.

18. The computer system of claim 16, wherein instantiating the second VM comprises updating software of the second VM relative to software of the first VM.

19. The computer system of claim 16, the stored program instructions further comprising:

program instructions to cause virtualizing, in the second VM, a second physical adapter virtualized by the first VM.

20. The computer system of claim 16, the stored program instructions further comprising:

program instructions to cause, subsequent to the check-pointing, suspending execution of the application on the first VM.

* * * * *